United States Patent [19]

Powell, Jr. et al.

[11] 3,926,582
[45] Dec. 16, 1975

[54] METHOD AND APPARATUS FOR PYROLYTIC TREATMENT OF SOLID WASTE MATERIALS

[75] Inventors: Orlo A. Powell, Jr., Wethersfield; Angelo J. Roncari, East Granby, both of Conn.

[73] Assignee: Urban Research & Development Corporation, East Granby, Conn.

[22] Filed: Jan. 5, 1973

[21] Appl. No.: 321,449

[52] U.S. Cl. ............... 48/62; 201/2.5; 201/15; 201/25; 201/32; 202/150; 202/221; 202/225; 48/209
[51] Int. Cl. ............... C10b 51/00; C10b 57/04
[58] Field of Search ............... 201/2.5, 1, 6, 11, 13, 201/15, 25, 27, 30, 32, 34, 36, 37, 38; 202/219, 221, 225, 150; 48/62, 209, 111

[56] References Cited
UNITED STATES PATENTS

| | | | |
|---|---|---|---|
| 2,798,032 | 7/1957 | Martin | 201/6 |
| 3,487,001 | 12/1969 | Needham | 201/34 X |
| 3,519,539 | 7/1970 | Schulte | 201/34 X |
| 3,525,674 | 8/1970 | Barnebey | 202/210 X |
| 3,582,279 | 6/1971 | Beckman et al. | 201/2.5 |

*Primary Examiner*—Norman Yudkoff
*Assistant Examiner*—D. Sanders

[57] ABSTRACT

Solid waste material is disposed of and a portion thereof converted into valuable refractory material within a reactor having a substantially vertical pyrolysis chamber, a refuse charging inlet and a combustible gas outlet in the upper region thereof and a molten refractory material outlet in the lower region thereof. Gas-feed means charges an oxygen-rich gas into the chamber under pressure at a plurality of vertically spaced points along the length thereof so as to produce combustion of the waste organic components and generate heat. The charging is controlled to maintain a plurality of different temperature zones along the length of the chamber so as to effect incomplete combustion of the waste organic component and form a combustible gas and an organicfree molten refractory material. Preferably the gas-feed means includes a substantially vertical core member with the chamber, for receiving and channeling the oxygen-rich gas through conduits therein, and the distribution of the oxygen-rich gas among the various conduits is controlled by temperature sensors located within the various temperature zones.

The solid waste material may be compacted prior to being charged through the refuse charging inlet and the molten refractory material withdrawn from the chamber may be prilled to form ceramic beads. The combustible gas may be processed to recover tars, and it may be burned to generate heat for producing power. The solid waste material contains as minimum weight values about 2.0 per cent of glass and ceramics, 18.0 per cent of paper products, 3.0 per cent of metals and 6.0 per cent of food waste and other organic materials.

36 Claims, 6 Drawing Figures

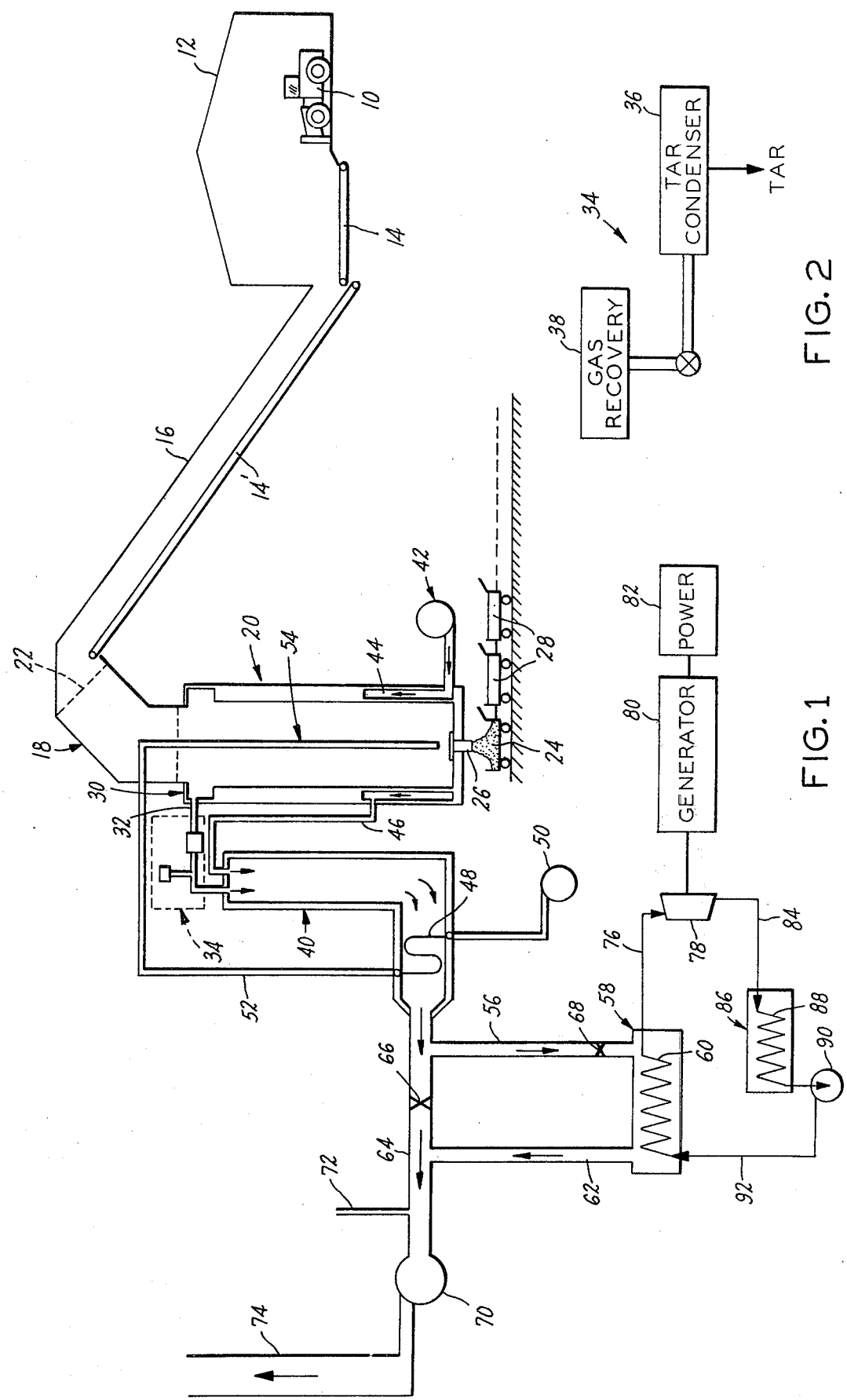

METHOD AND APPARATUS FOR PYROLYTIC TREATMENT OF SOLID WASTE MATERIALS

BACKGROUND OF THE INVENTION

Techniques have previously been proposed for the economic disposal of urban refuse by conversion to useful products intended for sale to offset the cost of collection and treatment. Treatment of refuse in such a manner to produce a refractory product through pyrolytic techniques has been disclosed in the prior art. Various of these techniques have involved the pretreatment of the refuse to provide separate fractions, the introduction of preheated oxygen-rich gas into a reactor either from the base or sidewalls, application of external heat to effect pyrolysis, and other expensive or inefficient techniques.

It should be understood that, for the purposes of this specification, except where the context clearly indicates otherwise, the term "pyrolysis" is to be comprehended as being used in a broad sense including the drying of refuse, the charring of incombustible organic material and the formation of inorganic oxides as well as the decomposition of organic material into volatile gases.

The term "solid waste material" as used herein, refers to the heterogenous mixture of organic wastes (including paper, food wastes, natural and synthetic rubbers, organic yard wastes, etc.) and inorganic wastes (including tin cans, glass, ceramics, etc.) conventionally obtained by urban refuse collection systems. It will be further described hereinafter.

Because of the low value of the refractory product obtained by prior act processes, such techniques have been of limited commercially feasibility and must operate at a very high level of efficiency. For example, the pyrolysis of the refuse should be closely controlled to insure that the organic components of the refuse are removed as volatiles so as to maximize both the purity of the refractory material being produced for sale and the percentage of the total available energy of the refuse being utilized by the system.

Existing pyrolysis reactors tend to be bulky in size to accommodate the large volumes of waste material to be processed and have elaborate mechanisms to seal the reactor during charging to preclude escape of the reactor gases. The size of these reactors and the need for elaborate sealing mechanisms obviously contribute to their high initial cost and high cost of operation.

Accordingly, it is an object of the present invention to provide a novel method and apparatus for disposing of solid waste material and obtaining substantially pure refractory material and combustible gas as products thereof.

It is also an object of the invention to provide such a method and apparatus which is highly economical as a result of the relatively low operating costs and high utilization of components.

It is another object to provide such a method and apparatus which enables close control of the pyrolytic treatment to obtain the maximum available energy from the refuse.

It is a further object to provide such a method and apparatus for producing valuable substantially pure ceramic prills as a product of the waste disposal technique.

It is a final object to provide such an apparatus which is smaller than devices of comparable capability and which does not require elaborate sealing mechanisms.

SUMMARY OF THE INVENTION

It has been found that the foregoing and related objects may readily be obtained by a method for disposing of and converting solid waste material in which there is provided a substantially vertical pyrolysis chamber, and solid waste material having organic and inorganic components is charged into the upper region of the pyrolysis chamber. The solid waste material contains as minimum weight values about 2.0 per cent of glass and ceramics, 18.0 per cent of paper products, 3.0 per cent of metals and 6.0 per cent of food waste and other organic materials. An oxygen-rich gas is charged under pressure into the chamber at a plurality of vertically spaced points along the length thereof so as to produce combustion of the organic components and generate heat. The charging of the oxygen-rich gas at the plurality of points is controlled to maintain a plurality of different and downwardly increasing temperature zones adjacent the plurality of vertically spaced points along the length of said chamber so as to effect incomplete combustion of the organic component and form a combustible gas in the upper zones and to melt and oxidize the inorganic components of said solid waste material into an organic-free molten refractory material in the lowermost zone, the temperature of the molten refractory material at the lower region of the pyrolysis chamber being at least about 1075° Centigrade. The combustible gas is removed from the upper region of the pyrolysis chamber and the molten refractory material is removed from the lower region thereof.

Preferably the oxygen-rich gas is introduced into the chamber about the vertical axis thereof and discharged outwardly into the chamber at the aforementioned points, this being most readily accomplished by providing a coaxial core within the chamber and introducing the oxygen-rich gas into the core and discharging it outwardly therefrom. Desirably the oxygen-rich gas is introduced in the upper region of the core and passed downwardly therethrough.

The temperatures prevailing in the zones are sensed and the discharge of the oxygen-rich gas at the aforementioned points is modified in response thereto to control the combustion of organic components therein. Thus the temperature of each zone is substantially independently controlled through regulation of the oxygen-rich gas discharged at each of the aforementioned points, the oxygen-rich gas itself being preheated to a controlled temperature.

The discharge of the oxygen-rich gas is controlled to maintain an upper zone of 375°–750° Centigrade, and preferably about 425°–600° Centigrade; a middle zone of about 550°–1075° Centigrade, and preferably about 700°–925° Centigrade; and a lower zone of about 1075°–1650° Centigrade, and preferably about 1100°–1300° Centigrade, The combustible gas is removed at a temperature of about 250°–550° Centigrade, and preferably about 275°–425° Centigrade. The control is effected by discharging into each zone about 45 to 60 percent by weight of the total of oxygen-rich gas being discharged, preferably about 10–25 percent by weight into the upper zone, 15-35 percent into the middle zone and 25–60 percent into the lower zone.

The waste material is compacted prior to charging, with the chamber preferably being sealed between intermittent charges. The removed combustible gas may be combined with oxygen-rich gas and substantially complete combustion thereof effected to heat a fluid medium, preferably the oxygen-rich gas to be discharged into the chamber.

The apparatus for disposing of solid waste is comprised of a reactor having a shell providing a substantially vertical pyrolysis chamber, a charging inlet and a gas outlet in the upper region thereof and a liquid outlet in the lower region thereof. Also provided are means for charging solid waste material having organic and inorganic components through said charging inlet and gas-feed means for discharging an oxygen-rich gas into the chamber under pressure at a plurality of vertically spaced points along the length thereof so as to produce combustion of the waste organic components and generate heat. Control means regulate the discharge of the oxygen-rich gas at the aforementioned points to maintain a plurality of different temperature zones along the length of said chamber, so as to effect incomplete combustion of the waste organic component and form a combustible gas and an organic-free molten refractory material.

The gas-feed means includes a substantially vertical coaxial core member within the said chamber to receive the oxygen-rich gas, the core member having ports adjacent the aforementioned vertically spaced points for discharge of the oxygen-rich gas therethrough. This may readily be accomplished by providing the gas-feed means with a plurality of substantially vertical coaxial conduits of differing length in said core member communicating with the core member ports, means for introducing the oxygen-rich gas into the conduits and discharging the oxygen-rich gas from the conduits into the chamber through the communicating core member ports. Desirably the means for introducing the oxygen-rich gas into the conduits is disposed adjacent the upper ends of the conduits for communication therewith, and the core member ports are disposed adjacent the lower ends of the conduits for communication therewith. The chamber is additionally provided with vertically spaced thermal sensors, the control means being responsive to the thermal sensors for controlling the oxygen-rich gas being discharged at the aforementioned points.

In a preferred embodiment the apparatus additionally includes a combustion chamber and heat exchange means therein for passage of a fluid medium therethrough. Also provided are means for conducting the removed combustible gas from the gas outlet to the combustion chamber, means for admixing oxygen-rich combustion gas with the combustible gas, and means for combusting the removed combustible gas and the oxygen-rich combustion gas in the combustion chamber to heat a fluid medium in the heat exchange means. Desirably the combustion chamber additionally includes means for passing oxygen-rich gas through the heat exchange means as the aforementioned fluid medium and a conduit from the heat exchange means to the gas-feed means, whereby the heat produced by the combustion heats the oxygen-rich gas prior to the discharge thereof into the pyrolysis chamber. In an alternative embodiment, instead of a combustion chamber there may simply be provided a heat exchanger, a conduit from the gas outlet to the heat exchanger for passing the removed combustible gas therethrough; and a conduit from the heat exchanger to the gas feed means whereby the oxygen-rich gas may be passed therethrough in heat exchange contact with the combustible gas for heating prior to its discharge into the pyrolysis chamber.

Additional features of the system may include a tar separation system comprised of a tar separating chamber, liquid spray means therein for spraying the removed combustible gas with liquid to condense tars therein and means for removing condensed tars therefrom. Burner means adjacent the base of the pyrolysis chamber may also be provided. Desirably the bottom end of the core member has a downwardly opening cavity therein and is spaced above the bottom of the chamber, the liquid outlet including a conduit extending centrally of and into the cavity of the core member.

Means may also be provided for compacting the solid waste material to be charged in which case the core member desirably includes a substantially vertical gas passage way in the upper portion thereof communicating at the ends thereof with the pyrolysis chamber, whereby the combustible gas will detour through the gas passageway to thereby partially bypass the compacted waste in the upper region of the pyrolysis chamber.

In another preferred embodiment, the disposal apparatus includes a substantially vertical prill chamber with a gas outlet opening at the top thereof. A reservoir for molten refractory material, extending across an upper horizontal section of the prill chamber, has a plurality of vertical gas conduits extending therethrough and a plurality of molten refractory discharge orifices at the base thereof. Conduit means conduct molten refractory material from the liquid outlet to the reservoir and means for introducing relatively cool gas into the prill chamber are disposed below the reservoir, whereby the gas rises through the droplets of refractory material to shape and partially cool the droplets into prills before passing through the vertical gas conduits and out the top gas outlet opening. Disposed in the prill chamber below the reservoir are means for receiving and collecting the prills. In a preferred embodiment the collecting means includes a substantially funnel-shaped portion, and additionally associated with the prill chamber are means for introducing liquid into the prill chamber and maintaining a thin layer of the liquid across the material-receiving surface of the funnel-shaped portion to further cool and cushion the impact of the shaped and partially cooled prills thereon and means for separating and separately discharging the liquid and the prills.

BRIEF DESCRIPTION OF THE DRAWINGS

FIG. 1 is a schematic view of a waste disposal system embodying the present invention;

FIG. 2 is an enlargement of the system of FIG. 1 circumscribed in phantom line;

DETAILED DESCRIPTION OF THE PREFERRED EMBODIMENTS

Solid Waste Material

Figure 4:
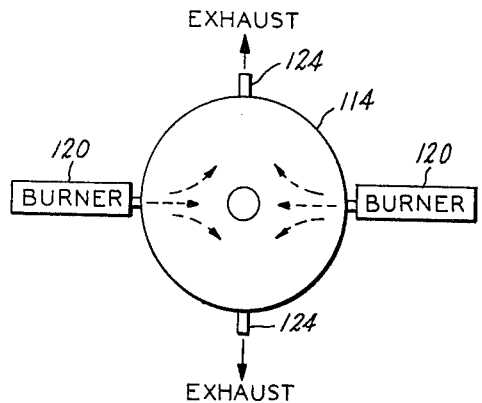
FIG. 4 is a schematic view of the burner and exhaust system located at the base of the reactor in FIG. 3.

The refuse which may be utilized as the solid waste material feed stock is a mixture or organic and inorganic materials of the type obtained from municipal rubbish and garbage collection, commercial and industrial waste, waste from demolition and comstruction operations, etc., and will normally contain as minimum values by weight, about 2.0 per cent of glass and ceramics, 18.0 per cent of paper products, 3.0 per cent of metals, and 6.0 per cent of food waste and other miscellaneous organic material. Although the composition of the refuse will vary depending upon its source, a more specific breakdown will usually include paper products, glass, ceramics, moisture, tin cans, articles of iron, steel and other metals, natural and synthetic rubbers and resins, food wastes, oils, paints, chemicals (organic and inorganic), yard wastes, leather textiles, wood, and inert materials. Refuse normally contains 15 – 30 per cent by weight of water; typically the dry material is made up of 60 – 95 per cent of volatile matter generally comprising the paper products, the natural organic materials and the synthetic resins, and the nonvolatile and relatively noncombustible components usually comprise about 5 – 25 per cent of siliceous materials and up to about 15 per cent of metals.

Refuse may, in addition, be analyzed on both a proximate and also an ultimate basis, typical values for a proximate analysis of the dry material being about 40 – 80 per cent of volatile matter, 15 – 5 per cent of fixed carbon and 45 – 15 per cent of ash and metal. On an ultimate basis, typical dry refuse contains about 25 – 85 per cent of carbon, about 2 – 10 per cent of hydrogen, about 15 – 50 per cent of oxygen, about 0.2 – 1.5 per cent of nitrogen, 0 to about 1.0 per cent of sulfur and about 5 – 35 per cent of glass, ceramic, stones, metals, ash and miscellaneous inert materials.

Although presently it is not generally necessary either to add to or extract from the refuse feed, in some instances it may be desirable to modify the mixture with respect to various components. Moisture usually found in the feed may be entirely removed or reduced, either as a control measure or to reduce the heating requirements of the system by avoiding the necessity of evaporating large amounts of water. On the other hand, it may be advantageous to introduce a quantity of water, particularly when a thermal decomposition technique is used, once again as a control factor or to influence the composition of the gas stream and/or the ceramic produced. Similarly, air may be added or removed from the material as a control mechanism and to affect the properties of the products, as will be more fully described hereinafter.

The refuse mixture may initially be treated in a magnetic separator to remove at least a portion of the ferrous content thereof, particularly if the metal is present as undesirably large pieces. Moreover, due to the increasing emphasis upon maximum utilization of mineral values, it is believed that such separation will in the near future assume greater importance than it has in the past. The heavy ferrous metal scrap may advantageously be separated for size alteration or for sale; the lighter ferrous metal scrap may be beneficially employed in combination with the residue in the production of certain types of metal-filled or reinforced articles.

The Process

Referring now to FIGS. 1 and 2, therein is schematically illustrated a process embodying the present invention. A garbage dump truck deposits solid waste material containing refuse of the type described hereinabove in a refuse receiving and storage building 12. A system of horizontal and inclined hinged steel belt conveyors 14 and 14', respectively, transports the refuse to the top of a refuse feed chute 16. As part of this stage of the process, metal removal, moisturizing or de-moisturizing and aerating of the refuse may be performed upon the material as it is being conveyed from the reception point to the feed hopper for the reactor. The solid waste material discharged from the feed chute 16 drops into a feed conduit generally designated by the numeral 18 and located at the upper end of the reactor generally designated by the numeral 20. Sealing means 22 are provided between the feed conduit 18 and the chute 16 to minimize flow of gases from the reactor 20 therethrough and sealing means (not shown) are also desirably provided between the feed conduit 18 and the reactor 20 to minimize flow of gases from within the reactor 20 when the refuse is not being charged into the reactor 20.

As the charged refuse falls through the reactor 20, it successively passes through zones of differing temperature and successively undergoes first drying and limited combustion, then pyrolysis or decomposition of its organic components and finally charring and oxidation to form a molten mass of metallic and other inorganic oxides. The structure of the reactor 20 and the process by which the charged refuse is converted into useful products will be described in great detail hereinafter in connection with a preferred reactor; however, it will suffice here to recognize that solid waste material charged into reactor 20 is converted into a combustible gas which rises into the upper region of the reactor and a molten refractory material which collects in the lowest region of the reactor. In this embodiment of the process, the molten refractory material is discharged as slag 24 through the slag nozzle 26 and loaded onto slag buggies 28 for removal from the system or transported to further processing.

The combustible gas is removed through combustible gas outlet 30 into the conduit 32 and is passed through a tar condensing and gas recovery system, generally designated by the numeral 34 and shown diagrammatically in FIG. 2, to remove the tars therefrom. The tar condensation is effected in a tar condenser unit 36 by spraying the stream of combustible gas with a suitable liquid such as water and separating the heavy tars which are condensed thereby from the condensing liquid, conveniently by decanting. The combustible gas may be passed to a gas recovery processing unit 38 wherein it is compressed and stored for future use or sale, or it may be transported to a combustion unit and heat exchanger generally designated by the numeral 40, and shown in FIG. 1. The manner in which the combustible gas is utilized is determined by the setting of a variety of valves and other control mechanisms, the general object being to utilize the combustible gas in the most efficient and economical manner possible.

A blower 42 forces an oxygen-rich gas such as air into an annular chamber 44 formed in the wall of the reactor 20 in the lower portion thereof, and this gas is preheated while it simultaneously cools the wall of the reactor 20 before it is conveyed by the conduit 46 to the combustion unit and heat exchanger 40 where it mixes with the combustible gas. Within the combustion unit 40, the hot gases are burned and generate additional heat which is partially utilized to transfer heat through the heat exchanger 48 located within the combustion unit 40. A blower 50 directs an oxygen-rich pyrolysis gas such as air through the heat exchanger 48 and then through the gas condiut 52 to the core member generally designated by the numeral 54 from which it is discharged into the reactor 20 at a plurality of vertically spaced points. This pre-heated gas facilitates the controlled combustion and pyrolysis in the reactor 20 as will be discussed more fully hereinafter.

Alternatively, if the blower 32 is de-activated or if the conduit 46 is closed off to the combustion unit 40 by a valve (not shown) oxygen-rich gas will not be introduced into the combustion unit 40 and the unit will serve only as a heat exchanger. In this embodiment of the process, the hot combustible gases entering through the conduit 32 passing in heat exchange contact with the oxygen-rich gas being supplied to the core member 54 by the blower 50. This hot combustible gas will then retain its fuel value and may, in fact, be passed in heat exchange contact prior to storage or utilization at a different installation.

In the illustrated embodiment of the process, the hot gases resulting from the combustion of the combustible gas in the combustion unit 40 may be cycled through the conduit 56 to a heat exchanger generally designated by the numeral 58 in which they pass in heat exchange contact with a suitable fluid medium (such as water) circulating through the coils 60 to convert that fluid medium into a pressurized fluid medium such as steam. The gases then exit through the conduit 62 and pass back to the main conduit 64. A valve 66 is provided in the main conduit 64 to control the flow of the hot combustible gases directly through the main conduit 64 or to the heat exchanger 58 through the conduit 56 by opening the valve 68 therein.

As the gases are moved through the conduit 64 towards discharge under the action of the blower 70, they may be cooled by the injection of water through the water injector 72 and they may be passed through particulate removal apparatus (not shown) prior to discharge through the stack 74. The resultant gases will thus be free of particulate matter and are comprised of essentially non-polluting components (carbon dioxide, oxygen, nitrogen and water vapor) which may be discharged to the atmosphere.

In the event that combustion of the combustible gas has not taken place in the combustion unit 40, the hot combustible gas may, nevertheless, be passed through the heat exchanger 58 depending upon the thermal gradient which then exists across the heat exchanger, or it may be funneled through the conduit 64 to a compressor and storage tank (not shown) for later use or sale.

In the heat exchanger 58 the water passes through the coils 60, is converted to steam under pressure and is conducted through the conduit 76 to the steam turbine 78 producing drive energy for the generator 80 which, in turn, results in power designated by the block 82. The spent steam exits from the turbine 78 through the conduit 84 and passes to the cooling tower generally indicated by the numeral 86 in which it gives some of its heat up as it passes through the coils 88. The now cooled steam may be discharged if so desired or it may be recycled through the system. Additional makeup water is introduced into the conduit 92 through the pump 90 and passes through the coils 60 to complete the loop.

Preferred Reactor

Figure 3:
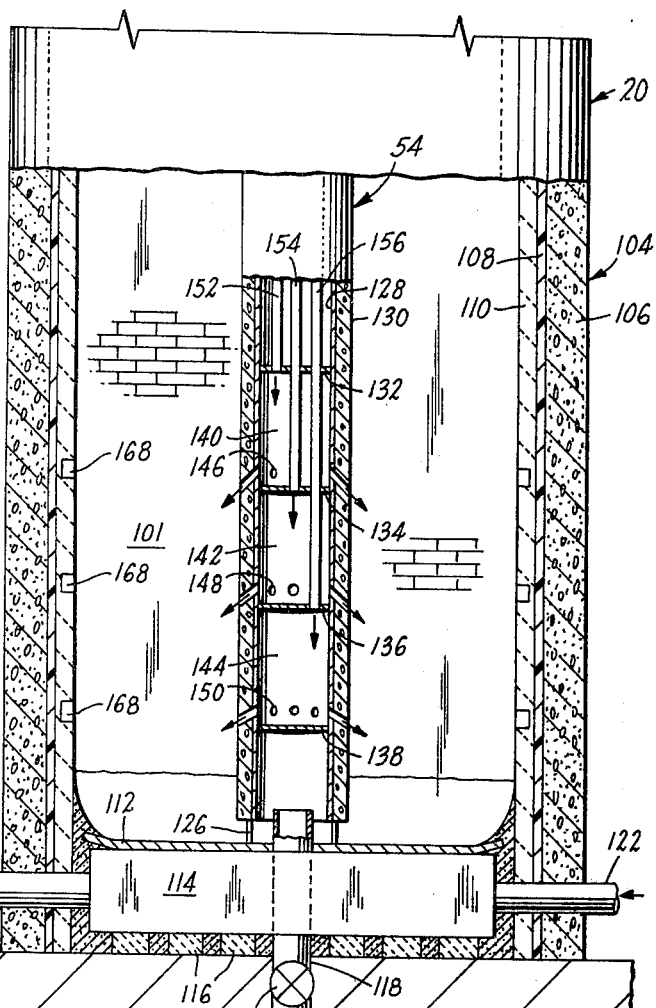
FIG. 3 is a fragmentary elevational view of a reactor embodying the present invention, with portions thereof being broken away to reveal internal construction.
Figure 5:
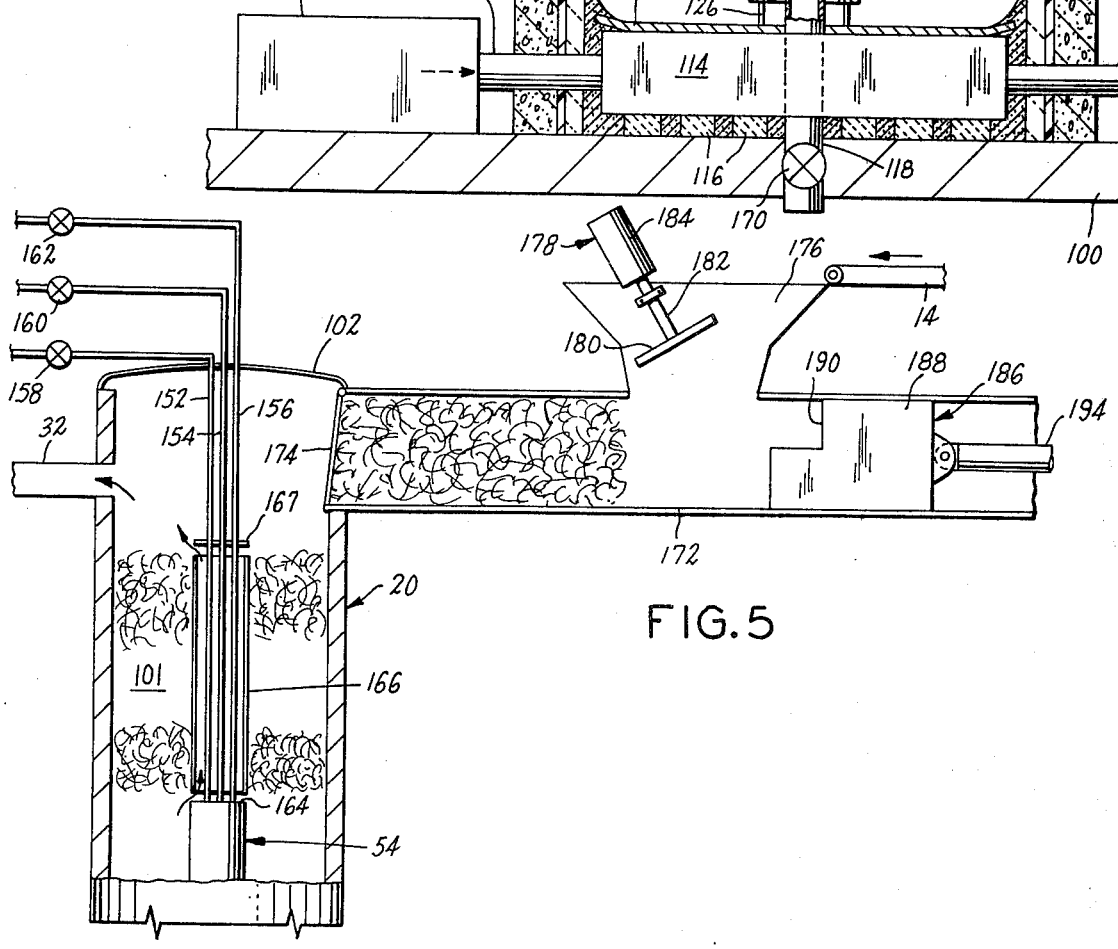
FIG. 5 is a partially diagrammatic, fragmentary elevational view to a reduced scale of the top portion of the reactor of FIG. 3 and the associated charging mechanism, with walls broken away to reveal internal construction.

Turning now in detail to FIGS. 3–5 of the drawings, therein illustrated is a preferred reactor/refuse compactor design. The reactor 20 is generally similar to that illustrated in FIG. 1 and is adapted to be employed in the overall process described with respect to FIGS. 1 and 2.

The reactor has a base or platform portion 100 and a dome portion 102, and a generally cylindrical, vertical sidewall, generally designated by the numeral 104, extends therebetween. As best seen in FIG. 3, the sidewall 104 includes a relatively thick concrete outer shell 106, an intermediate insulating layer 108 of alumina or the like, and an inner refractory brick lining 110. At the bottom of the reactor 20 over the base 100 are provided a floor plate 112, an annular heater unit 114 therebelow and refractory bricks 116 therebetween and thereabout. Extending through an aperture in the floor plate 112, the central aperture in the annular heater unit 114, the refractory bricks 116 and an aperture in the base 100, is an elongated discharge tube 118 which projects into the reactor chamber 101 and opens at a point spaced above the floor plate 112. Gas burners 120 to which a combustible fuel gas and air are supplied produce hot gases introduced into the heater unit 114 through the conduits 122 to effect heating of the floor plate 112 and thereby the contents of the reactor 20. The hot gases are discharged through the exhaust conduits 124.

Supported coaxially within the reactor chamber 101 is the core member 54 which extends from a point somewhat below the upper end of the discharge tube 118 and is supported upon the floor plate 112 by the spacer members 126, thus providing a baffled path from the main portion of the reactor chamber 101 to the inlet end of the discharge tube 118. The core member 54 is of generally cylindrical configuration and has a sidewall comprised of a high temperature alloy steel element 128 and an alumina outer shell 130. Extending transversely of the interior of the core member 54 are four wall members 132, 134, 136, 138, defining plenum chambers 140, 142, 144 therebetween. A multiplicity of discharge orifices 146, 148, 150 are provided in the sidewall of the core member 54 in each of the several plenum chambers 140, 142, 144, and are angled downwardly for discharge of air introduced thereinto outwardly into the main portion of the reactor chamber 101. Each of the plenum chambers 140, 142, 144 is separately fed by a heated air conduit 152, 154, 156 respectively and, as seen in FIG. 5, the volume of air to each of the several conduits may be regulated by the valves 158, 160, 162.

At its upper end, the core member 54 is closed by the top wall 164. Suppported on the top wall 164 by spacer members (not shown) and upon the conduits 152. 154, 156 by spacer members (not shown), is a gas bypass tube 166 which is of a length sufficient to extend above the normal level of refuse introduced into the reactor chamber 101. A top deflector 167 is spaced above the upper end thereof and supported upon the heated air conduits 152, 154, 156 so as to deflect refuse from the opening into the gas bypass tube 166. In this manner, gases being produced within the lower portion of the reactor chamber 101 may pass into and upwardly through the gas bypass tube 166 and thence outwardly therefrom above the level of the relatively compact refuse in the upper portion of the reactor chamber 101 through which its flow would be substantially impeded. These gases then enter into the upper portion of the reactor chamber 101 and are discharged through the combustible gas conduit 32.

Located in the recesses at spaced points along the height of the sidewall 104 are a plurality of thermocouples 168 for sensing the temperature therein and other thermocouples (not shown) are disposed in the alumina shell 130 of the core member 54. A valve 170 is provided in the discharge tube 118 to control flow of molten refractory material therethrough.

Turning now in detail to FIG. 5, therein partially schematically illustrated is a preferred refuse feed conduit and compactor design. The refuse feed conduit 172 extends into the reactor 20 adjacent the upper end thereof and its inner end has a sealing member 174 pivotably supported thereon. Refuse carried by the conveyor 14 is dropped into the hopper 176 and thence into the feed conduit 172. Movement of the refuse from the hopper 176 into the body of the feed conduit 172 is assisted by the crammer assembly generally designated by the numeral 178 which includes a plate 180 reciprocated by the piston 182 operating in the cylinder 184.

The refuse introduced into the feed conduit 172 is compacted by the ram assembly generally designated by the numeral 186. The ram head 188 is relatively massive and snugly fits within the feed conduit 172 so as to minimize the likelihood of refuse extending about the sides thereof during the compacting operation. It is provided with a cutout 190 in its upper forward face which provides a relief point during the compacting operation and minimizes the likelihood of jamming of the ram assembly 186 during the compacting operation. The ram head 188 is driven by an elongated piston 194 operating within a cylinder (not shown) so that it will compact refuse within the feed conduit 172 and also cause the compacted refuse to move along the length of the feed conduit 172, pivot the sealing member 174 and discharge into the upper end of the reactor chamber 101.

The Prilling Unit

Figure 6:
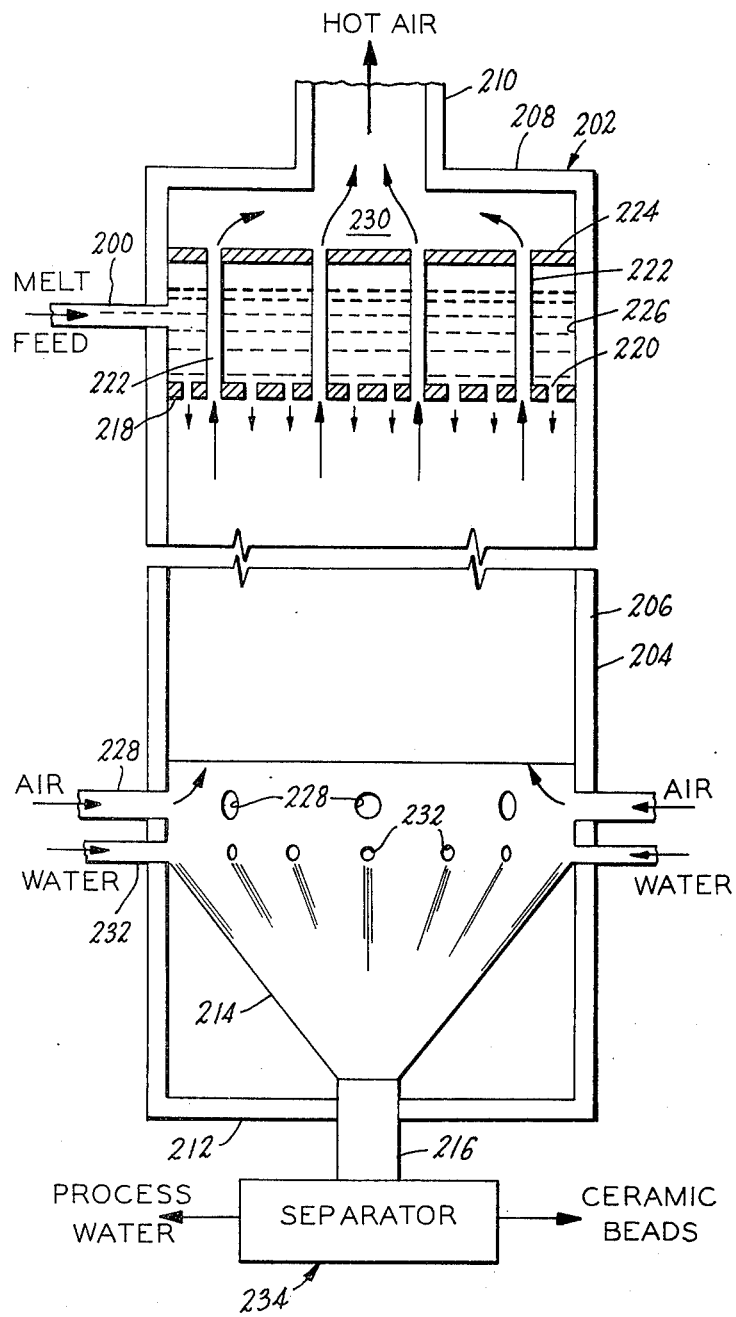
FIG. 6 is a fragmentary, partially schematic elevational view in section of prilling tower useful in the practice of the process of the present invention.

Turning now in detail to FIG. 6, therein illustrated is a prilling unit which may be used for the production of ceramic beads from the molten ceramic material produced in the reactor 20 as compared with the process shown in FIG. 1 wherein a ceramic slag is taken away in slag buggies. In this particular embodiment of the process, the molten ceramic material from the discharge tube 118 of the reactor 20 in FIG. 3 is conveyed through a conduit 200 to the prilling unit generally designated by the numeral 202.

The prilling unit 202 is comprised of a generally cylindrical shell 204 having a sidewall 206, top wall 208 with an exhaust duct 210 therein and a bottom wall 212. A funnel member 214 is disposed in the lower portion thereof and has a discharge tube 216 extending through the bottom wall 212.

At the upper end of the shell 204, high temperature refractory-coated, perforated plate 218 is located having a multiplicity of orifices 220 therein through which the molten ceramic material introduced thereabove may be discharged as indicated by the arrows. In addition, the perforated plate 218 seats the lower end of high temperature refractory gas tubes 222 which have their upper ends seated 170 the heater plate 224 spaced thereabove to define the feed chamber 226 therebetween into which the molten ceramic material is introduced.

Air is introduced into the shell 204 at a plurality of points spaced thereabout through the conduits 228 and this air passes upwardly through the shell 204, into the gas tubes 222 and is ultimately discharged from the plenum chamber 230 above the header plate 224 through the exhaust duct 210. Water is introduced into the funnel member 214 at a plurality of points spaced thereabout through the multiplicity of conduits 232, and it flows downwardly over the surface of the funnel member 214 to effect cooling thereof. The prills which are formed in the prilling unit 202, together with the water, exit through the discharge tube 216 and are passed into a sprayer unit schematically indicated by the block 234 in which there is effected the separation of the ceramic beads and the process water.

Operation of the Illustrated Embodiments

During startup, a special procedure is desirably employed so that the ceramic product withdrawn from the reactor may have the same generally stable composition and characteristics as will be produced during normal operation. To do so, a mass of the previously produced ceramic material in solidified form is introduced into the base of the reactor chamber 101 to a level somewhat below the level of the transverse wall 138 in the core member 54. The valve 170 in the discharge tube 118 is closed and the burners 120 are ignited. In doing so, the fuel gas supplied to the burners can be combustible gas produced previously and stored for utilization as fuel. Compacted refuse is charged into the upper portion of the reactor chamber 101 and settles upon the ceramic material which has been previously introduced.

After the temperature of the ceramic material in the bottom portion of the reactor chamber 101 has reached a predetermined minimum (usually about 1075° Centigrade), the flow of oxygen-rich gas is begun to the several heated air conduits 152, 154, 156 with the volume to each of the plenum chambers 140, 142, 144 being regulated by means of the valves 158, 160, 162. This will commence combustion and pyrolysis of the organic materials present in the refuse charged to the reactor 20 and, after the temperatures in the several reactor zones have reached the desired minima, the valve 179 may be opened and normal operation of the reactor begun with the molten ceramic material overflowing into the discharge tube 118.

During normal operation, the solid waste material carried by the conveyor 14 is dropped into the hopper 176 and is crammed into the feed conduit 172 by the crammer assembly 178. The refuse thus deposited is compacted by operation of the ram assembly 186 and is advanced along the length of the feed conduit 172 until it pivots the sealing member 174 and drops into the upper portion of the reactor chamber 101. Normally, the waste is sufficiently compacted so that it will minimize the likelihood of combustible gases from the reactor chamber 101 exiting into the refuse feed conduit 172 but the sealing member 174 is valuable as a gas seal during shutdown of the unit when there is no longer a reservoir of compacted refuse in the feed conduit 172.

The compacted refuse thus spreads itself about the upper portion of the reactor chamber 101 and is deflected from entering into the gas bypass 166 by the top deflector 167. As it is heated within the reactor chamber 101, it will tend to fluff out and moisture will be rapidly evolved.

As will be appreciated, the withdrawal of the molten ceramic material from the base of the reactor chamber 101 through the discharge tube 118 and the combustion or volatilization will cause the refuse charged to slowly descend through the reactor chamber 101. Following the initial evolution of moisture, the organic material will reach a temperature where, in the presence of oxygen-rich gas being introduced into the plenum chamber 140, combustion will begin with evolution of heat. Since the amount of oxygen-rich gas being furnished is being controlled to avoid complete combustion, this combustion will result in the production of a combustible gas which will pass upwardly through the reactor chamber 101 and bypass the relatively compact refuse in the upper portion of the reactor chamber 101 by entering and moving upwardly through the gas bypass tube 166. The combustible gas and moisture which is evolved will then exit from the reactor chamber 101 through the combustible conduit 32 for further processing as has been described hereinbefore with respect to FIGS. 1 and 2. Generally, the temperature of the combustible gas adjacent the conduit 32 is about 250° to 550° Centigrade and preferably about 275° to 425° Centigrade.

As has been indicated, oxygen-rich gas which is preheated to the desired controlled temperatures is being introduced to each of the several plenum chambers 140, 142, 144 and the volume and temperature thereof are controlled so that predetermined temperatures are maintained within the several zones of the reactor chamber 101 as may be determined by the thermocouples 168 located in the reactor wall 104 and core member 54. This control may be effected automatically by means of conventional analog control mechanisms, or manually if so desired. Optical pyrometers may also be used.

Generally, the temperature in the top or drying and initial combustion zone, which is disposed above the wall member 134 in the core member 54, is the zone of lowest temperature and into which proportionately the least oxygen rich gas is introduced. The temperature of this zone is maintained at about 375° to 750° Centigrade and preferably at aboutt 425°–600° Centigrade. The middle or pyrolysis zone is one of intermediate temperature on the order of about 550° to 1075° Centigrade and preferably about 700° to 925° Centigrade. It generally occupies the area above the wall member 136 in the core member 54 and below the drying and initial combustion zone. In this zone, the supply of oxygen-rich gas is again controlled so as to avoid complete combustion and to generate a combustible gas. Below this intermediate zone is the complete combustion and slag zone in which there is provided a relatively high volume of oxygen-rich gas to ensure complete combustion of any remaining organic materials and oxidation of any metallic materials into a molten ceramic. The temperature in this zone is maintained at about 1075° to 1650° Centigrade and preferably at about 1100° to 1300° Centigrade. In the lowest portion of the reactor which could be considered a portion of the complete combustion and slag zone, develops a pool of relatively pure and homogeneous molten ceramic material which flows under the lower end of the core member 54 and thence into the discharge tube 118.

Generally, for every part by weight of refuse introduced into the reactor, about 0.5 to 2.0 parts by weight of oxygen-rich gas must be introduced into the reactor chamber 101 through the core member 54 and preferably this amount will be about 0.8 to 1.5 parts depending upon the exact composition of the refuse, the temperature of the oxygen-rich gas and the temperature desired within the several reactor zones. This total amount of oxygen-rich gas is divided among the several conduits 152, 154, 156 by means of the valves 158, 160, 162 so that the volume supplied to the upper plenum chamber 140 will comprise about 10 to 25 percent by weight of the total. The volume channeled to the intermediate plenum chamber 142 will comprise about 15 to 35 percent by weight and that conveyed to the lowest plenum chamber 144 will comprise about 25 to 60 percent.

As will be appreciated, the discharge orifices 146, 148, 150 are angled downwardly from the horizontal to avoid channeling of the oxygen-rich gas directly through the refuse toward the sidewall 104 and thus minimizes the likelihood of burning out. This angling also ensures thorough distribution of the oxygen-rich gas throughout the annular reactor chamber 101 about the core member 54. The discharge orifices 146 are preferably at an angle of about 40° to 50° to the vertical axis of the core member 54, the discharge orifices 150 are preferably at an angle of about 55°–60°, and the discharge orifices 148 are preferably at an intermediate angle.

This effective division of the reactor chamber into three independently controllable temperature zones to which oxygen-rich gas is fed centrally enables close control of the pyrolysis of the organic components to produce a combustible gas of desired value and ensures that the ceramic material will be completely removed from the organic material when it is removed from the reactor. Moreover, it can be seen that all metallic components are oxidized to form the molten ceramic.

In accordance with a preferred embodiment of the process, the molten ceramic material exiting through the discharge tube 118 is conveyed through the conduit 200 to the prilling unit 202. It drips through the orifices 220 in the perforated plate 218 to form small droplets which then fall downwardly within the central chamber of the prilling unit 202. As the droplets fall, they are controlled by air which is passing upwardly in counter-current flow and which has been introduced into the chamber of the prilling unit 202 through the conduits 228. As a result, the molten ceramic droplets harden and solidify into generally spherical ceramic prills which then drop onto the surface of the funnel member 214 over which is flowing a stream of water introduced through the water conduits 232. This water flow further cools the prills and minimizes the impact forces and also serves to cool the funnel member 214. The mixture of prills and water is then discharged through the discharge tube 216 and passes to the separator 234. This may be a conventional decanting type mechanism, a centrifuge or the like in which the beads or prills are separated from the process water which then can be recirculated.

Although the composition of the ceramic product may vary, typically it contains, on a weight basis, about 20–70 percent of silicon dioxide, about 5–30 percent of aluminum oxide, about 5–20 percent of alkali metal oxides, about 1–20 percent of calcium oxide, about 1–30 percent of iron oxide, a trace to about 10 percent of magnesium oxide, a trace to about 5 percent of tin oxide, and trace amounts of lead, copper, barium, titanium, zinc and miscellaneous other metal oxides. The residue will normally also contain small amounts of dissolved gases, sulfur compounds (e.g., sulfates), etc. The properties of the ceramic material generally will not vary a great deal with refuse composition, and some control thereof can be obtained by varying the dissolved volatiles (e.g., water) and the atmosphere during fusion. Generally, the ceramic material has a relatively high coefficient of thermal expansion and a specific gravity normally in the range of about 2.8–3.5; it has a relatively low viscosity and, when solidified, will deform under its own weight at as low as 550° Centigrade. Compared to typical container glass compositions, the viscosity of the ceramic material of the present invention at elevated temperatures is much lower, its coefficient of expansion is higher, and it softens at temperatures significantly below that of such glass.

As indicated hereinbefore, the combustible gas which is exiting through the conduit 32 is passed through the combustion unit 40 wherein it is admixed with additional oxygen-rich gas and burned to generate heat. This heat is used to raise the termperature of air or other oxygen-rich gas passing through the heat exchanger 48 and used to supply the several heated air conduits 152, 154, 156 supplying the several plenum chambers of the reactor 20. The oxygen-rich gas is preferably heated to a temperature of at least 30° Centigrade and up to about 825° Centigrade depending upon the reactor conditions required. Generally, and preferably, the temperature of the oxygen-rich gas being introduced into the reactor 20 will be about 275° to 550° Centigrade.

Other aspects of the operation of the process have been described hereinbefore with respect to the description of FIGS. 1 and 2 of the drawings.

Depending upon the type of refuse charged and the operating conditions within the reactor, the combustible gas within the reactor will include water vapor, carbon monoxide, hydrogen, low boiling organic fractions, nitrogen and some entrained solid particulate material. It may contain organic tars which desirably are recovered as a by product of the process as indicated in FIG. 2 by passing the combustible gas through a tar condenser.

When required, the burners 120 may be operated to maintain the desired heat level within the reactor chamber 101 and thus they too may be subject to automatic control through an analog device.

As previously indicated, the oxygen-rich gas introduced to the upper portion of the reactor chamber or upper zone may vary from as little as 10 percent of the total input to as much as 25 percent. Since the primary input of oxygen-rich gas is required at the lowest zone and since only drying and limited combustion are required in the upper zone, the preferred percentage of oxygen rich gas directed into the upper zone will be about 10 to 15 percent. Since pyrolysis occurs in the intermediate zone, about 15 to 35 percent of the oxygen-rich gas is introduced into this zone. Under normal conditions, the preferred percentage will be 15 to 25 percent. As is readily apparent, it is essential that there be adequate oxygen-rich gas in the lowest zone to effect complete combustion of any remaining organics and to generate the heat necessary to convert any metals into oxides and to melt all oxides into a molten refractory material. As a result, the oxygen rich gas fed to the lowest zone will normally comprise 25 to 60 percent and preferably about 45 to 60 percent of the total input.

As has also been indicated previously, the oxygen-rich gas is desirably preheated so as to facilitate drying, combustion and pyrolysis within the reactor. However, in some instances it may be desirable to use ambient air in order to retard combustion occuring in one or more of the zones. However, for normal operation, the oxygen-rich gas will be preheated to temperatures from 30° to 825° Centigrade and preferably about 275° to 550° Centigrade.

Illustrative of the efficacy of the waste disposal system of the present invention is the following example in which all parts are by weight unless otherwise indicated.

EXAMPLE

The reactor used herein is similar in design to that shown in FIGS. 3–5 and has a height of 7.3 meters and an inside diameter of 2.4 meters. The outer surface of the sidewall is 22 cm thick reinforced concrete and the inside surface is provided by 15 cm thick refractory brick lining with a 5 cm thick insulation therebetween of alumina. The core member in the reactor has a 0.3 meter inside diameter and a 7 cm thick coating of alumina insulation. The base plate of the pyrolysis chamber, and the inside layer of the core member and of the molten ceramic discharge tube are composed of a nickel/steel alloy capable of withstanding extremely high temperatures and sold under the trademark INCOLOY 800 by The International Nickel Company.

The upper 2.4 to 3.0 meters of the reactor include the refuse charging inlet and combustible gas outlet and serve as the drying and initial combustion zone. The next lower 1.8 to 2.4 meters serve as the pyrolysis zone with the next lower 1.2 to 1.8 meters serving as the complete combustion and slag forming zone. The bottom 0.4 to 0.8 meters are occupied by the slag reservoir, the burner and exhaust system and the reactor base.

The reactor is started up by closing the molten ceramic discharge tube and introducing ceramic material previously produced by the subject process into the pyrolysis chamber. The burners are ignited using combustible gas previously produced by the subject process and solid waste material is charged into the chamber. When the temperature of the slag reaches 1100° C and combustion and pyrolysis are maintaining the desired heat levels in the several zones, the burners are switched to stand-by status for activation only if the slag temperature drops below 1100° C, and the molten residue drain pipe is opened.

In the regular course of operation, solid waste materials are fed into the feed hopper at a rate of about 4500 kilograms per hour. The refuse is vibrated into a 1 meter by 1 meter feed chute by a crammer or vibrating plate and compacted to one-third of its volume as the main ram which is rated to deliver a pressure of 2.1 kilograms per square centimeter reciprocates over a length of 1.5 meters within the feed chute at about 1 cycle per minute.

The charged material falls into the drying and intial combustion zone where the temperature is maintained at 425° to 600° C. In this zone, most of the water vapor is driven off and some of the organic matter undergoes inital combustion. The charge slowly continues its descent through the chamber and passes into the pyrolysis zone, where the temperature is maintained at 700° to 925° C. In this zone which has a supply of oxygen-rich gas insufficient to produce complete combustion, the organics decompose and volatilize. The remnants of the charge slowly descend into the slag complete combustion zone where the temperature is maintained at 1100° to 1300° C. In this zone, where an excess of oxygen is provided, the metals are oxidized and the char is burned off to provide an essentially homogeneous molten ceramic slag phase in the base of the reactor chamber which overflows into the ceramic discharge tube.

The various gases produced within the reactor chamber are removed as a combustible gas stream through the combustible gas outlet where the temperature is about 275° to 425° C. The removed combustible gases are introduced into a combustion chamber which is supplied with excess ambient air. The combustible gas undergoes further combustion at this point without further assistance, the temperatures within the combustion chamber rising, as a result of this combustion, to about 1000° to 2000° C depending upon the caloric value of the gas.

Air to be introduced into the reactor chamber is preheated by passage through a heat exchanger located within the combustion chamber, the air temperature being about 275° to 550° C upon exiting from the heat exchanger. The heated air is then distributed to the various pyrolysis air conduits in relative proportions according to the settings of the conduit valves, which are in turn determined by the thermocouples within the reactor. About 0.8 to 1.5 parts by weight of heated air are introduced into the reactor for every part by weight of refuse being introduced, the heated air being distributed among the pyrolysis gas conduits so as to effect the temperature zones hereinabove described.

The combustion products and volatiles withdrawn from the combustion chamber are further utilized to heat water in a steam generator before being scrubbed and exhausted.

Thus it can be seen from the foregoing detailed specification, drawings and example that the present invention provides a novel method and apparatus for disposing of solid waste material and obtaining substantially pure refractory material and combustible gas as products thereof. The method is highly economical as a result of relatively low operating costs and the high utilization of component fractions in the refuse, and the apparatus enables close control of the pyrolysis treatment to obtain maximum available energy from the refuse.

Having thus described the invention, we claim:

1. In a method for disposing of and converting solid waste material, the steps comprising:
   A. providing a substantially vertical pyrolysis chamber;
   B. charging solid waste material having organic and inorganic components into the upper region of said pyrolysis chamber, said solid waste material containing as minimum weight values, about 2.0 per cent of glass and ceramics, 18.0 per cent of paper products, 3.0 per cent of metals and 6.0 per cent of food waste and other organic materials;
   C. charging under pressure an oxygen-rich gas into said chamber at a plurality of vertically spaced points along the length thereof so as to produce combustion of said organic components and generate heat while controlling the charging of said oxygen-rich gas at said plurality of points to maintain a plurality of different and downwardly increasing temperature zones adjacent said plurality of vertically spaced points along the length of said chamber so as to effect incomplete combustion of said organic component and form a combustible gas in the upper zones and to melt and oxidize the inorganic components of said waste material into an organic-free molten refractory material in the lowermost zone, the temperature of said molten refractory material at the lower region of said pyrolysis chamber being at least about 1075° Centigrade; and
   D. removing said combustible gas from said upper region of said pyrolysis chamber and said molten refractory material from said lower region thereof.

2. The method of claim 1 wherein said oxygen-rich gas is introduced into said chamber about the vertical axis thereof and discharged outwardly into said chamber at said points.

3. The method of claim 2 including the additional step of providing a coaxial core within said chamber and wherein said oxygen-rich gas is intoduced into said core and discharged outwardly therefrom.

4. The method of claim 3 wherein said oxygen-rich gas is initially introduced into the upper region of said core and passed downwardly therethrough.

5. The method of claim 1 additionally including the step of sensing the temperatures prevailing in said zones and modifying the discharge of said oxygen-rich gas at said plurality of points in response thereto to control the combustion of said organic components therein.

6. The method of claim 1 wherein the temperature of each of said zones is substantially independently controlled through regulation of said oxygen-rich gas discharged at each of said plurality of points.

7. The method of claim 1 wherein said oxygen-rich gas is preheated and the temperature thereof is controlled.

8. The method of claim 1 additionally including the step of compacting said waste material prior to charging.

9. The method of claim 8 wherein said compacted waste material is intermittently charged into said chamber and wherein there is included the step of substantially sealing said chamber between charges.

10. The method of claim 1 additionally including the step of combining said removed combustible gas with oxygen-rich gas and causing substantially complete combustion thereof to heat a fluid medium.

11. The method of claim 10 wherein said fluid medium heated by said combustion is at least in part said oxygen-rich gas prior to the discharge thereof into said chamber.

12. The method of claim 7 additionally including the step of passing said combustible gas in heat exchange contact with said oxygen-rich gas prior to the introduction thereof into said chamber to effect heating thereof.

13. The method of claim 1 additionally including the steps of spraying said removed combustible gas with liquid to condense tars therein and removing said condensed tars therefrom.

14. The method of claim 10 wherein the fluid medium is water which is converted to steam and additionally including the step of passing said steam through a turbine to derive energy therefrom.

15. The method of claim 1 including the additional start-up steps of:

A. charging said lower region of said chamber with refractory material and said upper region of said chamber with said solid waste material,
B. suspending said removal of said molten refractory material, and
C. externally heating lower region of said chamber to melt said charged refractory material therein and to effect initial combustion of said solid waste material.

16. The method of claim 1 wherein said discharge of oxygen-rich gas is controlled to maintain an upper zone having a temperature of about 375° to 750° Centigrade, a middle zone having a temperature of about 550° to 1075° Centigrade, and a lower zone having a temperature of about 1075° to 1650° Centigrade.

17. The method of claim 16 wherein said discharge of oxygen-rich gas is controlled to maintain an upper zone having a temperature of about 425° to 600° Centigrade, a middle zone having a temperature of about 700° to 925° Centigrade and a lower zone having a temperature of about 1100° to 1300° Centigrade.

18. The method of claim 1 wherein said combustible gas is removed at a temperature of 250° to 550° Centigrade.

19. The method of claim 1 wherein said combustible gas is removed at a temperature of 275° to 425° Centigrade and said molten refractory material is removed at a temperature of 1075° to 1650° Centigrade.

20. The method of claim 16 wherein said discharge of oxygen-rich gas is controlled to maintain said zones at said temperatures by discharging into each of said zones about 45 to 60 percent by weight of the total of said oxygen-rich gas being discharged.

21. The method of claim 20 wherein about 10 to 25 percent by weight of the total of said oxygen-rich gas being discharged is discharged into said upper zone, about 15 to 35 percent into said middle zone, and about 25 to 60 percent into said lower zone.

22. Apparatus for disposing of solid waste comprising:
A. a reactor having a shell providing a substantially vertical pyrolysis chamber, a charging inlet and a gas outlet in the upper region thereof and a liquid outlet in the lower region thereof;
B. means for charging solid waste material having organic and inorganic components through said charging inlet;
C. gas-feed means for charging an oxygen-rich gas into said chamber under pressure at a plurality of vertically spaced points along the length thereof so as to produce combustion of the waste organic components and generate heat, said gas-feed means including a substantially vertical coaxial core member within said chamber to receive the oxygen-rich gas, said core member having ports adjacent said plurality of vertically spaced points for charging of the oxygen-rich gas therethrough said gas-feed means further including conduit means communicating between said core member and a source of oxygen-rich gas for supplying oxygen-rich gas under pressure to said plurality of vertically spaced points; and
D. means for controlling the changes of the oxygen-rich gas at each of said plurality of vertically spaced points to maintain a plurality of different temperature zones along the length of said chamber so as to effect incomplete combustion of the waste organic component and form a combustible gas and an organic-free molten refractory material whereby the combustible gas is removed through said gas outlet and the molten refractory material is removed through said solids outlet, said control means including plurality of vertically spaced thermal sensors, said control means being responsive to temperatures sensed by said thermal sensors for controlling the oxygen-rich gas being charged at each of said plurality of vertically spaced points;
E. and means for preheating the oxygen rich gas at said source of oxygen rich gas prior to passage into said conduit.

23. The apparatus of claim 22 wherein said gas-feed means includes a substantially vertical coaxial core member within said chamber to receive the oxygen-rich gas, said core member having ports adjacent said plurality of vertically spaced points for discharge of the oxygen-rich gas therethrough.

24. The apparatus of claim 22 wherein said gas-feed means includes conduit means for introducing the oxygen-rich gas into the top of said core member for downward passage therethrough.

25. The apparatus of claim 23 wherein said gas-feed means includes a plurality of substantially vertical coaxial conduits of differing length in said core member communicating with said core member ports, and means for introducing the oxygen-rich gas into said conduits and discharging the oxygen-rich gas from said conduits into said chamber through said communicating core member ports.

26. The apparatus of claim 25 wherein said means for introducing the oxygen-rich gas into said conduits is disposed adjacent the upper ends of said conduits for communication therewith, and said core member ports are disposed adjacent the lower ends of said conduits for communication therewith.

27. The apparatus of claim 22 additionally including means for compacting the waste material prior to charging.

28. The apparatus of claim 22 additionally including a combustion chamber;
heat exchange means in said combustion chamber for passage of a fluid medium therethrough;
means for conducting the removed combustible gas from said gas outlet to said combustion chamber;
means for admixing oxygen-rich combustion gas with said combustible gas; and
means for combusting the removed combustible gas and the oxygen-rich combustion gas in said combustion chamber to heat a fluid medium in said heat exchange means to provide said means for preheating.

29. The apparatus of claim 28 additionally including means for passing oxygen-rich gas through said heat exchange means as the fluid medium and a conduit from said heat exchanger to said gas-feed means, whereby the heat produced by the combustion heats the oxygen-rich gas prior to the discharge thereof into said pyrolysis chamber.

30. The apparatus of claim 22 additionally including a heat exchanger; a conduit from said gas outlet to said heat exchanger for passing the removed combustible gas therethrough; a conduit from said heat exchanger to said gas feed means whereby the gas may be passed therethrough in heat exchange contact with combustible gas for heating prior to its discharge thereof into said pyrolysis chamber to provide said means for preheating.

31. The apparatus of claim 22 additionally including a tar separating chamber, liquid spray means therein for spraying the removed combustible gas with liquid to condense tars therein and means for removing condensed tar therefrom.

32. The apparatus of claim 24 wherein each of said ports at a given vertical level is disposed at a first angle to the vertical, said ports at higher vertical levels being disposed at lower angles to the vertical than said ports at lower vertical levels.

33. The apparatus of claim 32 wherein said ports at the highest vertical level are disposed at about a 40° to 50° angle to the vertical and said ports at the lowest vertical level are disposed at about a 55° to 65° angle to the vertical.

34. The apparatus of claim 22 additionally including burner means adjacent the base of said chamber.

35. The apparatus of claim 22 wherein the bottom end of said core member has a downwardly opening cavity chamber therein and is spaced above the bottom of said chamber and wherein said liquid outlet includes a conduit extending centrally of and into said cavity of said core member.

36. The apparatus of claim 22 wherein said core member includes a substantially vertical gas passageway in the upper portion thereof communicating at the ends thereof with said chamber, whereby the combustible gas will detour through said gas passageway to thereby partially bypass the waste material charged in said upper region of said chamber.

* * * * *